United States Patent
Chen

(10) Patent No.: US 8,018,437 B2
(45) Date of Patent: Sep. 13, 2011

(54) MOUSE WITH IN-THE-AIR POSITIONING FUNCTION AND COMPUTER DEVICE USING THE SAME

(75) Inventor: Li-Ming Chen, Keelung (TW)

(73) Assignee: Sunplus mMedia Inc., Hsinchu (TW)

( * ) Notice: Subject to any disclaimer, the term of this patent is extended or adjusted under 35 U.S.C. 154(b) by 547 days.

(21) Appl. No.: 12/292,481

(22) Filed: Nov. 20, 2008

(65) Prior Publication Data
US 2009/0135141 A1    May 28, 2009

(30) Foreign Application Priority Data

Nov. 23, 2007  (TW) ............................... 96144518 A

(51) Int. Cl.
*G06F 3/033* (2006.01)
(52) U.S. Cl. ...................... 345/166; 345/163; 345/157
(58) Field of Classification Search .................. None
See application file for complete search history.

(56) References Cited

U.S. PATENT DOCUMENTS

| | | | |
|---|---|---|---|
| 6,927,758 B1 * | 8/2005 | Piot et al. ...................... | 345/166 |
| 7,474,297 B2 * | 1/2009 | Moyer et al. .................. | 345/163 |
| 7,907,120 B2 * | 3/2011 | Gordon et al. ................ | 345/166 |

\* cited by examiner

*Primary Examiner* — Muhammad N Edun
(74) *Attorney, Agent, or Firm* — Bacon & Thomas, PLLC

(57) ABSTRACT

A mouse with coordinate and suspension positioning functions, which receives a directional light produced by an external illuminator. A second image sensor receives and converts the directional light into an electrical signal, and accordingly produces a directional image corresponding to the directional light. A second memory stores the directional image. When an image captured by a first image sensor cannot be focused, a processor enables the second image sensor and the second memory in order to analyze the directional image and obtain a rotating angle of the directional light for further fulfilling a coordinate positioning.

18 Claims, 5 Drawing Sheets

MOUSE WITH IN-THE-AIR POSITIONING FUNCTION AND COMPUTER DEVICE USING THE SAME

BACKGROUND OF THE INVENTION

1. Field of the Invention

The present invention relates to a technical field of image positioning system and, more particularly, to a mouse with in-the-air positioning function and computer device using the same.

2. Description of Related Art

FIG. 1 is a schematically exploded view of a typical optical mouse. As shown in FIG. 1, the typical optical mouse includes a housing 1, a circuit board 2, a lens set 3 and a barrier sheet 4. The housing 1 consists of an upper cover 11 and a base 12 with a window 121. The circuit board 2 is fixedly arranged in the housing 1. A sensor 21 with a receiving section 211 is arranged on the circuit board 2. A vertical cavity surface emitting laser (VCSEL) or light emitting diode (LED) 22 is arranged adjacent to one end of the sensor 21 on a plane the same as the receiving section 211. The receiving section 211 of the sensor 21 is aligned with the window 121. The lens set 3 with convex 31 is arranged on the base 12 of the housing 1. A channel 32 is arranged close to the convex 31. The center of one end of the channel 32 has a refraction portion 321. The convex 31 has top and bottom surfaces aligned with the receiving section 211 of the sensor 21 and the window 121 respectively. Also, one opening of the channel 32 is aligned with the VCSEL or LED 22. The typical optical mouse lights the VCSEL 22 to thereby capture a mouse pad image, and compares the image captured and a reference image for controlling the cursor on a screen.

However, since various electronic technologies are rapidly advanced but the profit made from conventional mouse products is rapidly reduced, the conventional mouse products have to integrate more functions to thereby increase the added value.

Therefore, it is desirable to provide an improved optical mouse to mitigate and/or obviate the aforementioned problems.

SUMMARY OF THE INVENTION

The object of the present invention is to provide a mouse with in-the-air positioning function, which can increase additional functions on the mouse to thereby increase the added value.

According to a feature of the invention, a mouse with in-the-air positioning function is provided, which receives a directional light from an external illuminator. The mouse includes a first image sensor, a first light source, a first memory, a second image sensor, a second memory and a processing unit. The first image sensor captures a mouse pad image. The first light source lights at a lighting frequency to thereby provide the first image sensor to capture an image on a mouse pad or surface. The first memory stores the mouse pad image captured by the first image sensor. The processing unit compares the image with a reference image for providing a cursor of coordinate positioning on a screen with respect to the mouse. The second image sensor receives the directional light from the external illuminator, converts the directional light received into an electrical signal, and produces a directional image corresponding to the directional light based on the electrical signal. The second memory stores the directional image produced by the second image sensor. The processing unit is connected to the first memory and the second memory, wherein, when the mouse is airborne, the processing unit enables the second image sensor in order to obtain a rotating angle of the directional light as the cursor of coordinating positioning.

According to another feature of the invention, a computer device with in-the-air positioning function for input is provided, which includes a screen, an external illuminator and a mouse. The screen displays images, and the external illuminator is installed above the screen of the notebook for producing a directional light. The mouse includes a first image sensor, a first light source, a first memory, a processing unit, a second image sensor and a second memory. The first image sensor captures an image. The first light source lights at a lighting frequency to thereby provide the first image sensor to capture an image on a mouse pad or surface. The first memory stores the image captured by the first image sensor. The processing unit compares the image and a reference image for providing a reference of coordinate positioning on a screen with respect to the mouse. The second image sensor receives the directional light from the external illuminator, converts the directional light received into an electrical signal and produces a directional image corresponding to the directional light based on the electrical signal. The second memory stores the directional image produced by the second image sensor. The processing unit is connected to the first memory and the second memory, wherein, when the mouse is airborne, the processing unit enables the second image sensor to obtain a rotating angle of the directional light by analyzing the directional image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
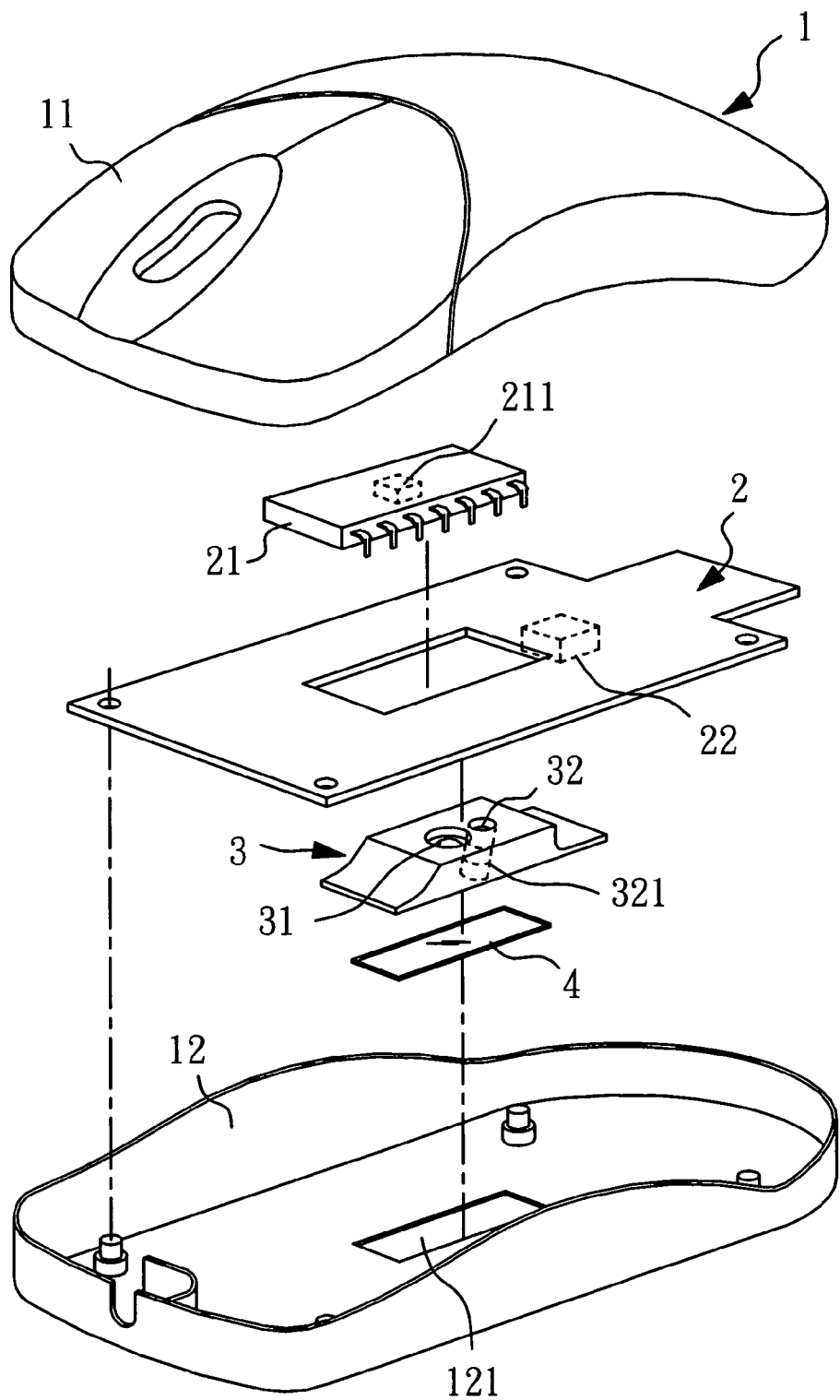
FIG. 1 is a schematically exploded view of a typical optical mouse.
Figure 2:
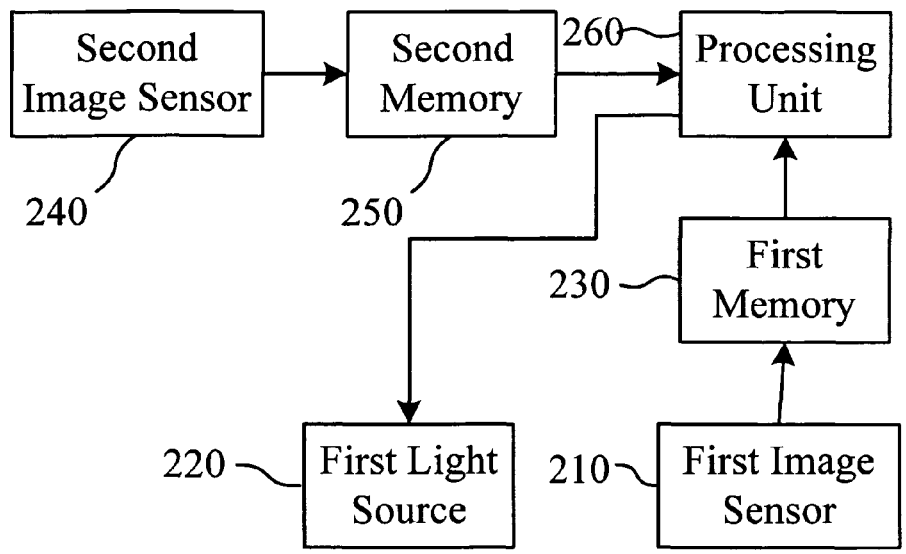
FIG. 2 is a block diagram of a mouse with in-the-air positioning function according to the invention.

FIG. 2 is a block diagram of a mouse with in-the-air positioning function according to the invention, which receives a directional light produced by an external illuminator. In FIG. 2, the mouse includes a first image sensor 210, a first light source 220, a first memory 230, a second image sensor 240, a second memory 250 and a processing unit 260.

The first image sensor 210 captures an image from a mouse pad image or the surface. The first light source 220 lights at a lighting frequency to thereby provide the first image sensor 210 to capture the image from the mouse pad. The first image sensor 210 consists of a photosensitive array, an analog to digital converter (ADC) and a filter. The photosensitive array captures the image from the mouse pad and the captured image is an analog image signal. The ADC converts the analog image signal into a digital image data. The filter filters the noises from the digital image data. The first memory 230 stores the digital image data captured by the first image sensor 210. The digital image data is stored in a frame manner.

The second image sensor 240 receives the directional light produced by the external illuminator (not shown), converts the directional light received into an electrical signal, and produces a directional image corresponding to the directional light according to the electrical signal. The second memory 250 stores the directional image produced by the second image sensor 240. The external illuminator consists of a large LED and a small LED.

The processing unit 260 is connected to the first memory 230 and the second memory 250, wherein, when the mouse pad image captured by the first image sensor 210 cannot be focused, the processing unit 260 enables the second image sensor 240 in order to obtain a rotating angle of the directional light by analyzing the directional image. Thus, a coordinate positioning is achieved.

In this embodiment, the first image sensor 210, the first light source 220 and the first memory 230 are typically basic blocks of the optical mouse for the performance. When the mouse pad image captured by the first image sensor 210 cannot be focused, it indicates that the optical mouse is raised, and the in-the-air positioning function of the optical mouse is activated. At this point, the processing unit 260 enables the second image sensor 240 and the second memory 250. The second image sensor 240 captures the directional light produced by the external illuminator and accordingly analyzes the directional image to thereby obtain a rotating angle of the directional light. Thus, the coordinate positioning function is achieved.

The second image sensor 240 receives the directional light produced by the external illuminator, converts the directional light received into an electrical signal, and produces a directional image corresponding to the directional light according to the electrical signal. The second image sensor 240 is preferably a complementary metal oxide semiconductor (CMOS) image sensor.

The directional image produced by the second image sensor 240 is stored in the second memory 250 for further image processing and analyzing by the processing unit 260, thereby obtaining a rotating angle of the directional light.

Figure 3:
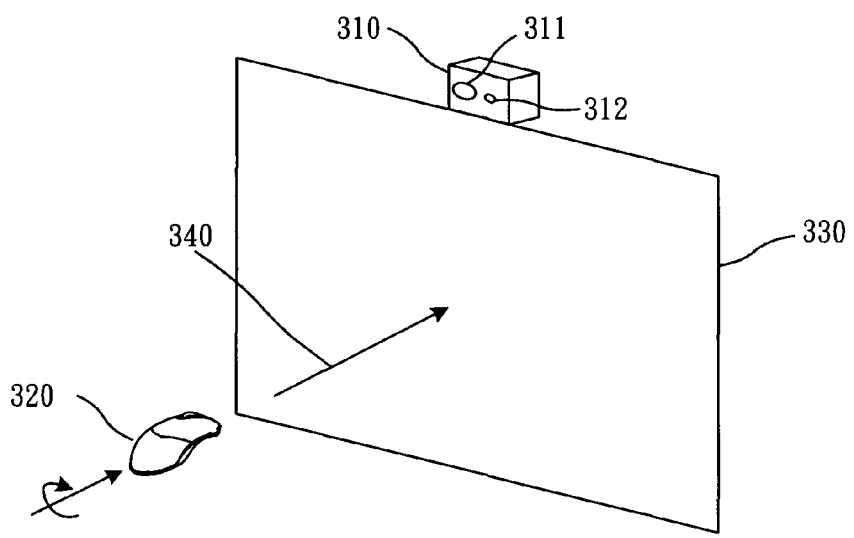
FIG. 3 is a schematic diagram of use of an external illuminator and a mouse with in-the-air positioning function according to the invention.

FIG. 3 is a schematic diagram of use of a mouse 320 with in-the-air positioning function and an external illuminator 310 according to the invention. The external illuminator 310 produces the directional light. In this embodiment, the external illuminator 310 consists of a large and a small LEDs 311, 312 to thereby produce the directional light. In other embodiments, the external illuminator 310 consists of an L-shaped LED to produce the directional light. Alternatively, the external illuminator 310 consists of a first LED of a predetermined shape and a second LED of a shape different from the first LED to thereby produce the directional light.

As shown in FIG. 3, the external illuminator 310 producing the directional light is disposed above a screen 330 without affecting the image displayed on the screen 330. In this case the mouse 320 with in-the-air positioning function can provide typical optical mouse functions and the in-the-air positioning function. Alternatively, the screen 330 can be an LCD screen, and in this case the mouse 320 only provides the in-the-air positioning function.

The mouse 320 uses the second image sensor 240 to receive the directional light produced by the external illuminator 310 and to produce an image corresponding to the directional light in order to accordingly analyze the directional image to thus obtain a rotating angle of the directional light and further achieve the coordinate positioning function.

Figure 4:
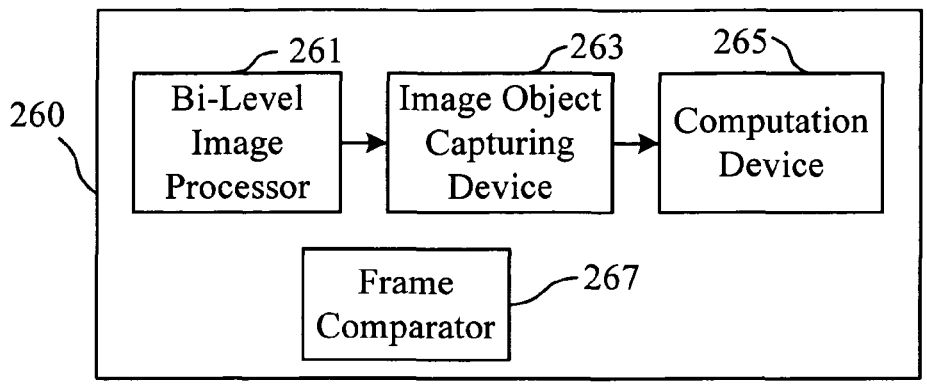
FIG. 4 is a block diagram of a processing unit according to the invention.

FIG. 4 is a block diagram of the processing unit 260. The processing unit 260 is connected to the second memory 250 in order to perform a bi-level image pre-processing on the image to thus obtain a bi-level image. The processing unit 260 also captures image objects corresponding to the directional light from the bi-level image to accordingly produce the rotating angle of the directional light.

As shown in FIG. 4, the processing unit 260 includes a bi-level image processor 261, an image object capturing device 263, a computation device 265 and a frame comparator 267. The frame comparator 267 is connected to the first memory 230 in order to find movement of the mouse 320 on the mouse pad, which is known to those skilled in the art and thus a detailed description is deemed unnecessary.

The bi-level image processor 261 is connected to the second memory 250 in order to perform the bi-level image pre-processing and produce the bi-level image.

The image object capturing device 263 is connected to the bi-level image processor 261 in order to capture the image objects corresponding to the directional light from the bi-level image and produce a working image object. The computation device 265 is connected to the image object capturing device 263 in order to compute the center of gravity and a direction of the working image object to accordingly produce the rotating angle θ of the directional light.

The computation device 265 is based on the direction and a predetermined vector $\vec{B}$ to produce the rotating angle θ of the directional light. The rotating angle θ can be expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

Figure 5:
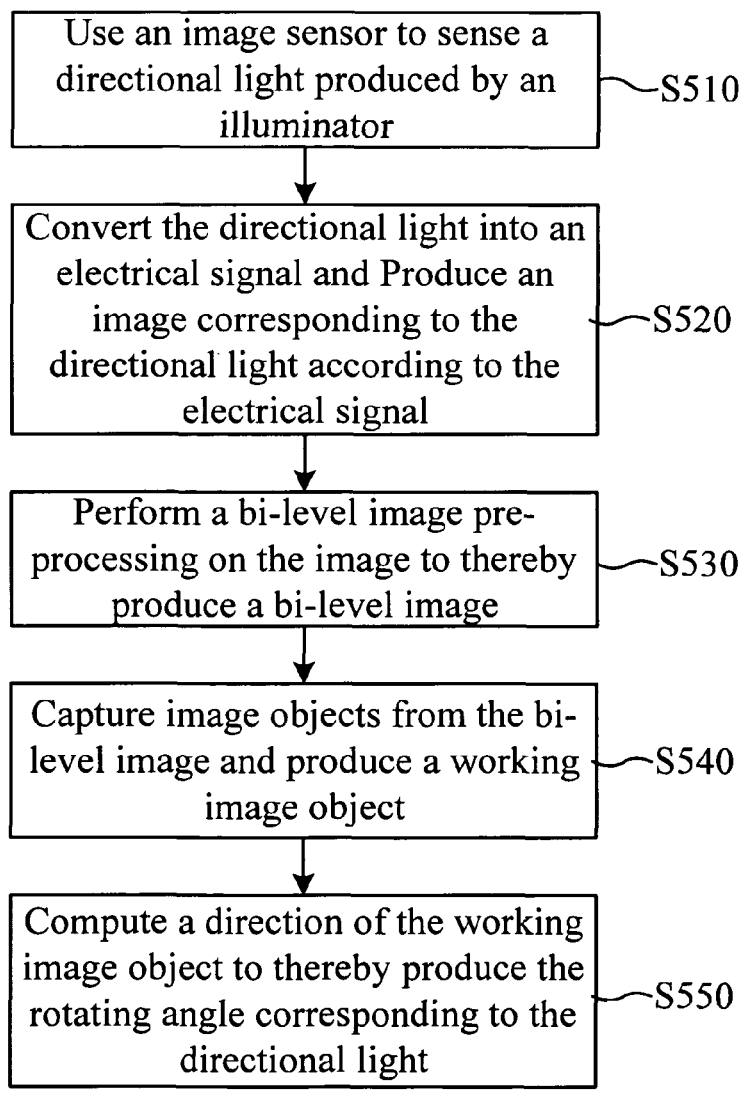
FIG. 5 is a flowchart of a suspension positioning method according to the invention.

FIG. 5 is a flowchart of an in-the-air positioning method according to the invention. Referring to FIGS. 3 and 5, the method computes a rotating angle of the mouse 320 with respect to the directional light from the external illuminator 310. First, step S510 uses the second image sensor 240 to receive the directional light produced by the external illuminator 310.

Step S520 converts the directional light into an electrical signal and produces an image corresponding to the directional light according to the electrical signal. When the mouse 320 counterclockwise rotates θ with respect to the axis indicated by the arrow 340 of FIG. 3, the second image sensor 240 senses the light respectively produced by the LEDs 311, 312 at the white sensing pixels, and otherwise at the black ones. In this case, the white sensing pixels have a gray value approximately greater than 200, and the black sensing pixels have a gray value approximately smaller than 50.

Step S530 performs the bi-level image pre-processing on the image to thereby produce a bi-level image, which is produced by the following pseudo-code:

```
if(pix_value > 150)
    then pix_value = 255
elseif(pix_value < 70)
    then pix_value = 0
endif
``` where pix_value indicates a pixel value. Namely, a pixel value is set to 255 when it is greater than 150, and to zero when it is smaller than 75. Thus, the bi-level image is formed.

Step S540 captures image objects corresponding to the directional light from the bi-level image and accordingly produces a working image object. Step S540 essentially captures the image objects of the LEDs 311, 312. Each image object has a minimum rectangle, a center and an area. The minimum rectangle is a minimum rectangle containing the images of the LEDs 411 and 412. In this embodiment, the areas of the image objects are used to determine the image objects respectively of the large LED 411 and the small LED 412.

Step S550 computes a direction of the working image object to thereby produce the rotating angle θ of the directional light. In this embodiment, the center of the image object of the large LED 311 is defined as the start point, and that of the small LED 312 is defined as the end point. The start point is connected to the end point to thereby form the direction. Next, the rotating angle θ of the directional light is produced according to the direction and a predetermined vector $\vec{B}$, where the predetermined vector is the horizontal line of the bi-level image sensed by the second image sensor 240. Namely, the rotating angle θ can be expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

Figure 6:
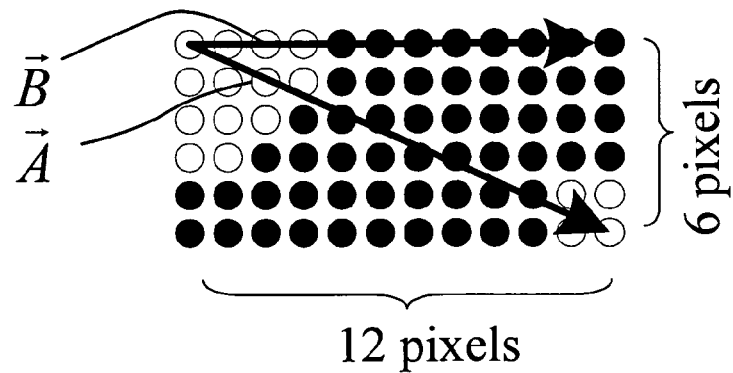
FIG. 6 is a schematic graph of a partial enlargement of an image sensed by an image sensor according to the invention.
Figure 7:
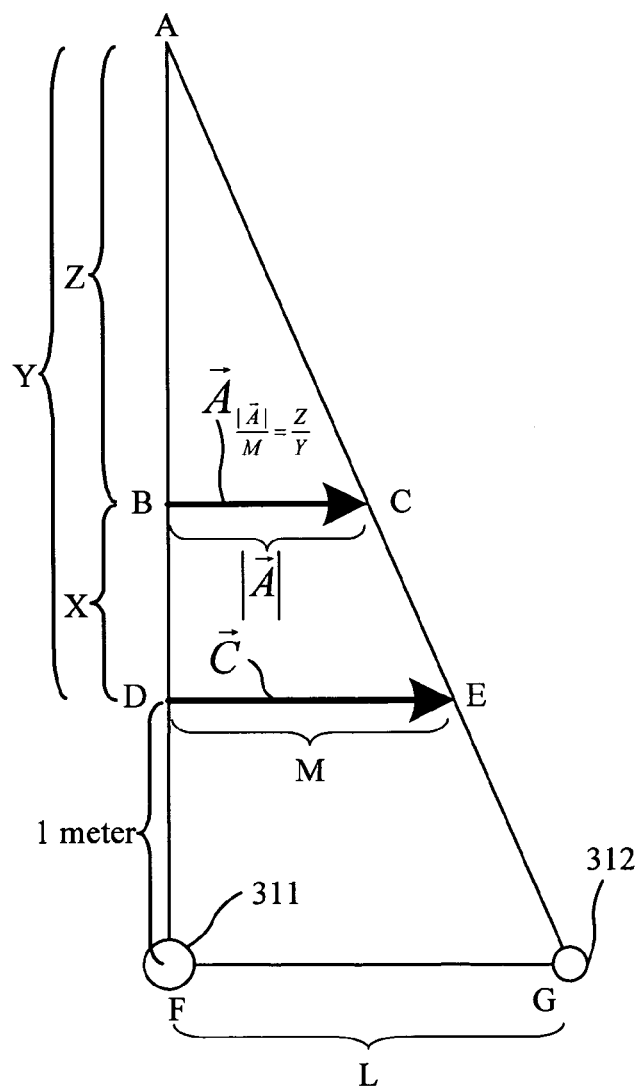
FIG. 7 is a schematic graph of computing a relative distance from an illuminator to an image sensor according to the invention.

The invention defines the center of the image object of the large LED as the start point and that of the small LED as the end point to thereby produce the direction, and also defines the centers of the start and end points as a reference point for positioning. The invention uses the rotating angle θ, the positions of the reference point and the distance from the start point to the end point to find a final absolute positioning coordinate. The invention uses a triangle ranging to convert the distance from the start point to the end point into a relative distance from the illuminator 410 to the second image sensor 240. FIG. 6 is a partial enlarged view of an image sensed by the second image sensor 240. As shown in FIG. 6, the length of the vector $\vec{A}$ of the direction has $\sqrt{12^2+6^2}=\sqrt{180}$ pixels long. FIG. 7 is a schematic graph of computing the relative distance from the illuminator 410 to the second image sensor 240. As shown in FIG. 7, the vector $\vec{C}$ is a vector obtained by pre-measuring the image sensor 420 and the illuminator 410, i.e., capturing the center of the image object of the large LED 311 as the start point and that of the small LED 312 as the end point at a distance of one meter far from the large LED 311 and connecting from the start point to the end point. The length of the vector $\vec{C}$ has M pixels long. The distance from the large LED 311 to the small LED 312 is set to L meters. Upon ΔADE~ΔAFG, $$\frac{M}{L} = \frac{Y}{Y+1} \text{ and } Y = \frac{M}{L-M}.$$

Further, upon ΔADE~ΔABC, $$\frac{|\vec{A}|}{M} = \frac{Z}{Y} \text{ and } Z = Y \times \frac{|\vec{A}|}{M}.$$

Therefore, the second image sensor 240 has a distance of X+1=(Y−Z)+1 from the illuminator 410. Such a triangle ranging application can be easily accomplished by a person skilled in the art according to the description of the invention, and no more detail is described.

In the aforementioned embodiment, the illuminator 310 consists of the large and the small LEDs 311, 312 to produce the directional light. In other embodiments, the illuminator 410 can be an L-shaped LED or consist of an LED of a predetermined shape and an LED of a shape different from the predetermined one, so as to produce the direction light. The corresponding bi-level image processing step, image object capturing step and the computing step can be easily accomplished by a person skilled in the art, and no more detail is described.

Figure 8:
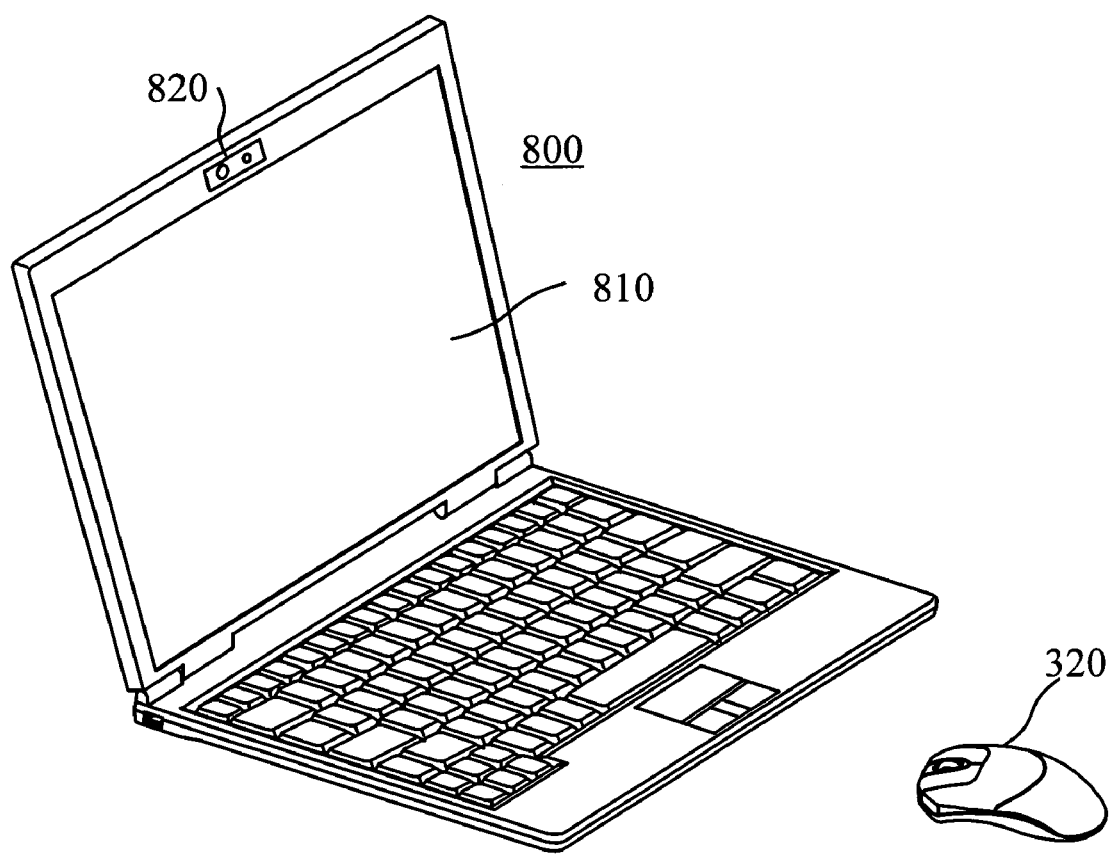
FIG. 8 is a schematic view of an exemplary application of a mouse with in-the-air positioning function according to the invention.

FIG. 8 is a schematic view of an exemplary application of the mouse 320 with in-the-air positioning function according to the invention. As shown in FIG. 8, a computer device, such as a notebook 800, includes a screen 810, an external illuminator 820 and the mouse 320 with the suspension positioning function.

The screen 810 displays an image. The external illuminator 820 is disposed above the screen 810 and produces a directional light.

When the mouse 320 is in a regular mode, the typical optical mouse functions are performed. When the in-the-air positioning function of the mouse 320 is activated, the processing unit 260 enables the second image sensor 240 and the second memory 250 in order to obtain a rotating angle from the directional light by receiving and analyzing the directional image produced by the external illuminator 820. Thus, the in-the-air positioning function is performed to replace the typical optical mouse functions, such as a cursor for coordinate positioning function, in the regular mode.

As cited, the invention disposes the external illuminator 310 above the screen to produce the directional light, and uses the second image sensor 240 to sense the images produced by the external illuminator 310. Accordingly, the invention analyzes the corresponding positions and area shapes of the spots and obtains the new directional coordinate and relative distance. Such a technique can be applied to an input of a remote control or wireless mouse to thereby control the position and specific action of cursor on the screen.

When the technique is applied to the remote control, it is able to solve the problem that the remote control cannot effectively position the absolute coordinate on the LCD screen and provide the available information such as a relative distance from the remote control to the LCD screen.

Although the present invention has been explained in relation to its preferred embodiment, it is to be understood that many other possible modifications and variations can be made without departing from the spirit and scope of the invention as hereinafter claimed.

What is claimed is:

1. A mouse with in-the-air positioning function, which receives a directional light from an external illuminator, comprising:
   a first image sensor;
   a first light source, which lights at a lighting frequency to thereby provide the first image sensor to capture an image on a mouse pad or surface;
   a first memory, which stores the image captured by the first image sensor;
   a processing unit, which compares the image with a reference image for providing a cursor of coordinate positioning on a screen with respect to the mouse;
   a second image sensor, which receives the directional light from the external illuminator, converts the directional light received into an electrical signal, and produces a directional image corresponding to the directional light based on the electrical signal; and
   a second memory, which stores the directional image produced by the second image sensor;
   wherein when the mouse is airborne, the processing unit enables the second image sensor in order to obtain a rotating angle of the directional light by analyzing the directional image and to refer to the rotating angle of the directional light as the cursor of coordinating positioning.

2. The mouse as claimed in claim 1, wherein the processing unit comprises:
   a bi-level image processor, which is connected to the second memory, for performing bi-level image pre-processing to produce a bi-level image;
   an image object capturing device, which is connected to the bi-level image processor, for capturing image objects corresponding to the directional light from the bi-level image and producing a working image object; and
   a computation device, which is connected to the image object capturing device, for computing a direction of the working image object to accordingly produce the rotating angle of the directional light.

3. The mouse as claimed in claim 2, wherein the computation device is based on the direction and a predetermined vector to produce the rotating angle of the directional light.

4. The mouse as claimed in claim 3, wherein the rotating angle θ is expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

5. The mouse as claimed in claim 4, wherein the first and the second image sensors are a CMOS image sensor.

6. The mouse as claimed in claim 5, wherein the external illuminator includes a large LED and a small LED for producing the directional light.

7. The mouse as claimed in claim 5, wherein the external illuminator includes an L-shaped LED for producing the directional light.

8. The mouse as claimed in claim 5, wherein the external illuminator includes a first LED with a pre-determined shape and a second LED with a shape different from the first LED, so as to produce the directional light.

9. The mouse as claimed in claim 5, wherein the mouse is an optical mouse or a laser mouse.

10. A computer device with in-the-air positioning function for input, comprising:
    a screen for displaying;
    an external illuminator disposed above the screen for producing a directional light; and
    a mouse including:
    a first image sensor;
    a first light source, which lights at a lighting frequency to thereby provide the first image sensor to capture an image on a mouse pad or surface;
    a first memory, which stores the image captured by the first image sensor;
    a processing unit, which compares the image with a reference image for providing a reference of coordinate positioning on the screen with respect to the mouse;
    a second image sensor, which receives the directional light from the external illuminator, converts the directional light received into an electrical signal, and produces a directional image corresponding to the directional light based on the electrical signal; and
    a second memory, which stores the directional image produced by the second image sensor;
    wherein when the mouse is airborne, the processing unit enables the second image sensor to obtain a rotating angle of the directional light by analyzing the directional image and to refer to the rotating angle of the directional light as the reference of coordinating positioning.

11. The computer device as claimed in claim 10, wherein the processing unit comprises:
    a bi-level image processor, which is connected to the second memory in order to perform bi-level image pre-processing to produce a bi-level image;
    an image object capturing device, which is connected to the bi-level image processor in order to capture image objects corresponding to the directional light from the bi-level image and produce a working image object; and
    a computation device, which is connected to the image object capturing device in order to compute a direction of the working image object to accordingly produce the rotating angle of the directional light.

12. The computer device as claimed in claim 11, wherein the computation device is based on the direction and a predetermined vector to produce the rotating angle of the directional light.

13. The computer device as claimed in claim 12, wherein the rotating angle θ is expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

14. The computer device as claimed in claim 13, wherein the first and the second image sensors are a CMOS image sensor.

15. The computer device as claimed in claim 14, wherein the external illuminator includes a large LED and a small LED to produce the directional light.

16. The computer device as claimed in claim 14, wherein the external illuminator includes an L-shaped LED to produce the directional light.

17. The computer device as claimed in claim 14, wherein the external illuminator includes a first LED with a predetermined shape and a second LED with a shape different from the first LED, so as to produce the directional light.

18. The computer device as claimed in claim 10, wherein the computer device is applied to cursor control.

* * * * *